J. A. BRENNAN.
RESILIENT VEHICLE WHEEL.
APPLICATION FILED SEPT. 7, 1920.
1,405,395.
Patented Feb. 7, 1922.
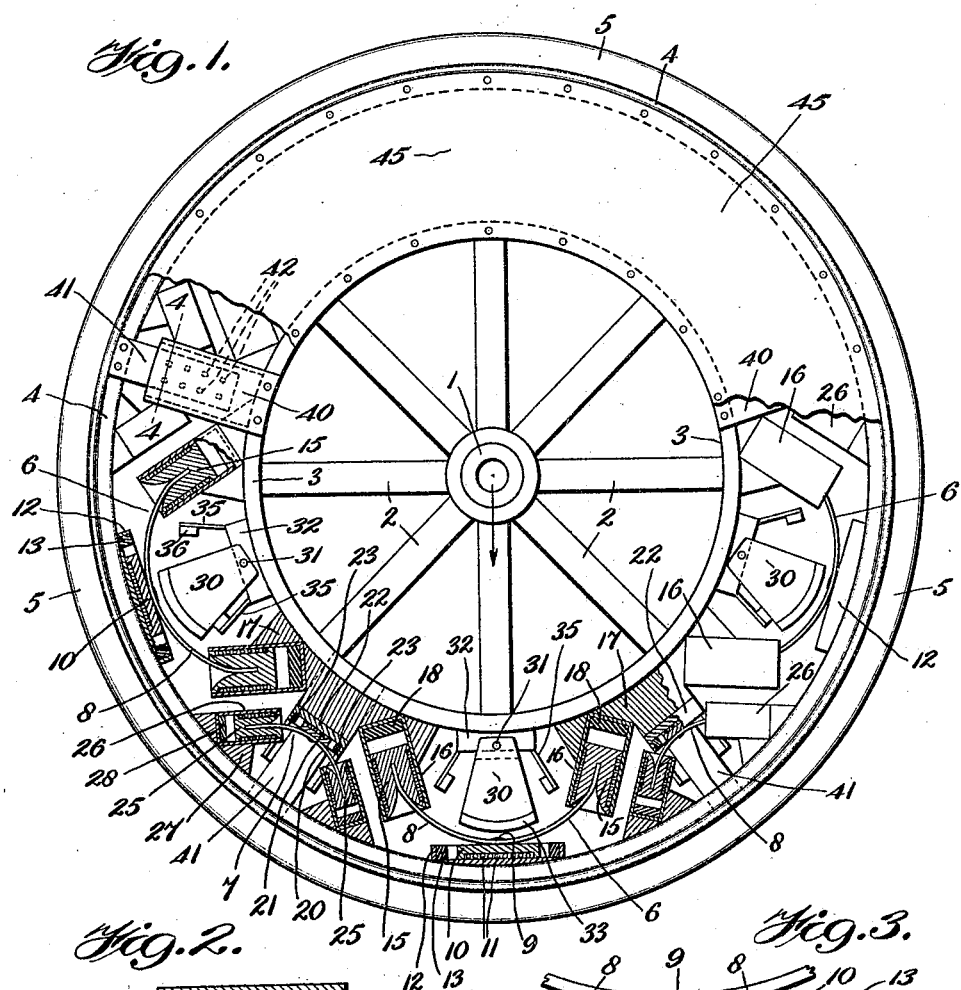
Fig. 1.
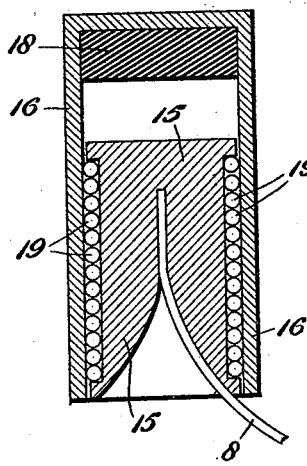
Fig. 2.
Fig. 3.
Fig. 4.
Inventor
John A. Brennan, by
T. A. Witherspoon
Attorney

UNITED STATES PATENT OFFICE.

JOHN A. BRENNAN, OF NEW YORK, N. Y.

RESILIENT VEHICLE WHEEL.

1,405,395.

Specification of Letters Patent.   Patented Feb. 7, 1922.

Application filed September 7, 1920.  Serial No. 408,513.

*To all whom it may concern:*

Be it known that I, JOHN A. BRENNAN, a citizen of the United States, residing at New York, in the county of New York and State of New York, have invented certain new and useful Improvements in Resilient Vehicle Wheels; and I do hereby declare the following to be a full, clear, and exact description of the invention, such as will enable others skilled in the art to which it appertains to make and use the same.

This invention relates to resilient wheels for vehicles and has for its object to provide a device of this character which will be simple in construction and more efficient in action than those which have heretofore been proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:

Figure 1 is a diagrammatic side elevational view partly in section, of a wheel made in accordance with this invention;

Figure 2 is a diagrammatic vertical sectional view on an enlarged scale of one of the anti-friction devices with which the ends of the spring members are provided;

Figure 3 is a diagrammatic vertical sectional view of one of the anti-friction slide members associated with the mid portion of the spring members; and Figure 4 is a cross sectional view taken on the line 4—4 of Figure 1.

1 indicates any suitable hub structure into which are fitted the spokes 2, carrying on their outer ends the rim member 3, as will be clear from Figure 1. 4 designates an outer rim provided with the solid or other tire 5 and normally adapted to be mounted concentrically with the inner rim 3 as shown.

Interposed between the said inner rim 3 and the outer rim 4 are a plurality of main spring connections 6, symmetrically arranged around the circumference of the said rims; and associated therewith between adjacent main spring members are a plurality of auxiliary springs 7, as will be clear from the drawings.

The main spring members 6 comprise a suitable leaf or other spring 8 secured in any desired manner as at 9 to a sliding member 10 provided with ball, roller or other anti-friction bearings 11 and adapted to move laterally within the housing or ways 12, which housing is rigidly connected to the outer rim 14. The said housing preferably takes the form of a hollow box like structure as will be clear from Figures 1 and 3, and preferably carries at each of its ends a suitable buffer or cushioning means 13, such, for example, as a rubber pad, a spring, or other suitable members.

The members 13, as will be readily apparent, are adapted to cushion the movement of the slide 10 in either direction. Each end of the spring members 8 carries a sliding member 15 mounted for movement within the casing 16, suitably secured as by the blocks 17 to the inner rim 4 (see Figure 1.) The said casing 16 is preferably square or rectangular in cross section, and is open at one end and closed at the other. The said casing is preferably provided at its closed end with a suitable buffer member 18 such, for example, as a block of rubber or other resilient material, which buffer member is adapted to cushion the inward movement of the slide member 15 as will be readily apparent.

The said slide member is preferably provided with suitable anti-friction bearings 19 as will be clear from the drawings.

The auxiliary spring members 7 are or may be, similar in construction to the main spring members just described, and are illustrated as comprising leaf springs 20 rigidly fastening at or near their mid portion to a slide member 21 adapted for a lateral movement in a plane at right angles to the wheel axle in a housing 22 which housing is provided with suitable resilient cushion members 23 similar to the members 13 carried by the housings 12.

The free ends of the springs 20 are likewise provided with sliding members 25 mounted in suitable housings 26 which housings 26 are suitably secured to the outer rim 4 as for example, by means of the blocks 27 shown in Figure 1. The housings 26 are likewise provided with suitable buffer members 28 similar to the members 18 carried by the housings 16.

As above stated, a plurality of the main spring members 6 are arranged around the periphery of the wheel in symmetrical relation, and each of the said main spring members has associated with it a suitable stop or buffer mechanism adapted to limit the spring action of the members. In the form of the invention here illustrated this buffer mechanism comprises a pendulous member 30 pivotally secured as at 31 to a projection 32 carried by the inner rim 3 and the outer surface of the said member 30 is preferably curved as shown, and provided with the rubber or other buffer member 33 adapted under certain conditions to contact with and limit the movement of the spring member 6, as will presently appear.

It will be noted that the members 30 being pendulously mounted from the rim 3 will always tend to hang in a vertical position when at the lowermost part of their travel, whereas, during the upper parts of their travel they will tend to fall from a radial position. In order to limit the amount of their movement about their pivots 31 suitable stop members 35 having buffers 36 may be associated with the blocks 32 carried by the inner rim 3.

In order to prevent side motion of one rim with respect to the other in a direction parallel to the wheel axle while at the same time permitting relative motion between the two rims in directions at right angles to the said wheel axle, there is provided a plurality of slidable plates comprising channel shaped members 40 rigid with the said inner rim 3, as best shown in Figure 1, and associated with each of said channel shaped members is an anti-friction bearing member 41 rigid with the outer rim 4 and provided with a plurality of anti-friction members or balls 42 (see Fig. 4). It will be readily apparent from this construction that all motion in a direction parallel to the wheel axle will be prevented, while at the same time a certain amount of motion necessary in devices of this type will be permitted in planes at right angles to the said wheel axle.

If desired, the resilient mechanism comprising the main spring devices 6 and the auxiliary spring devices 7, the pendulous members 30 and the members 40 for preventing lateral motion may be covered and protected from dirt, dust, etc., by means of a suitable flexible or resilient covering 45, suitably secured to the inner rim 3 and the outer rim 4, as will be clear from Figure 1.

The operation of this said wheel will be clear from the foregoing, but may be briefly summarized as follows:

Suppose the parts be in the positions illustrated in Figure 1 with the weight of the vehicle resting upon the inner rim 3, the lower spring member 6 will be placed under tension, causing the slidable members 15 carried by its ends, to move upwardly within their casings 16 until the said members 15 strike against the buffers 18 carried within said casing 16 above disclosed. The pendulous member 30 being at its lowest point of travel, will hang vertical so that the mid portion of the spring 6 will contact with the resilient member 33 carried thereby, and thus limit the amount of spring had from the member 6.

In like manner, as the vehicle moves forward, the load will be transmitted from the lowermost spring 6 to the auxiliary spring member 7 adjacent thereto, and then to the next main spring member 6, all in a manner as will be readily apparent.

It is obvious that those skilled in the art may vary the details of construction as well as the arrangement of parts without departing from the spirit of the invention, and therefore, I do not wish to be limited to the above disclosure except as may be required by the claims.

What I claim is:

1. In a resilient vehicle wheel the combination of an inner rim; an outer rim normally concentric with said inner rim; a plurality of main resilient members mounted between said rims and having slidable connection therewith; auxiliary resilient members having sliding connection with said inner and outer rims, mounted between adjacent main resilient members; pivoted means carried by said inner rim adapted to limit the movement of said main resilient members; and means rigid with said rims adapted to permit of eccentricity between them but to prevent relative motion between them in a direction parallel to the wheel axis, substantially as described.

2. In a resilient vehicle wheel the combination of an inner rim; an outer rim normally concentric with said inner rim; a plurality of slide members carried by said outer rim; a spring carried by each of said slide members; a plurality of casings carried by said inner rim; slidable members carried by the ends of said springs and adapted to operate within said casings; means adapted to permit of eccentricity between said rims but to prevent relative motion between them in a direction parallel to the wheel axis; and pendulous means carried by said inner rim adapted to limit the motion of said springs, substantially as described.

3. In a resilient vehicle wheel the combination of an inner rim; an outer rim normally concentric with said inner rim; a plurality of slide members carried by said outer rim; a spring carried by each of said slide members; a plurality of casings carried by said inner rim; slidable members carried by the ends of said springs and adapted to operate within said casings; a plurality of slide members carried by said inner rim; auxiliary springs carried by each of said last mentioned slide members; a plurality of housings carried by said outer rim; slide blocks carried by the ends of said auxiliary springs adapted to operate in said housings; means adapted to permit of eccentricity between said rims but to prevent relative motion between them in a direction parallel to the wheel axis; and pendulous means carried by said inner rim adapted to limit the motion of said springs, substantially as described.

4. In a resilient vehicle wheel the combination of an inner rim; an outer rim normally concentric with said inner rim; a plurality of slide members carried by said outer rim; a spring carried by each of said slide members; a plurality of casings carried by said inner rim; slidable members carried by the ends of said springs and adapted to operate within said casings; a plurality of slide members carried by said inner rim; auxiliary springs carried by each of said last mentioned members; a plurality of housings carried by said outer rim; slide blocks carried by the ends of said auxiliary springs adapted to operate in said housings; means adapted to permit of eccentricity between said rims but to prevent relative motion between them in a direction parallel to the wheel axis; pendulous means carried by said inner rim adapted to limit the motion of said springs; and means adapted to limit the swing of said pendulous means, substantially as described.

In testimony whereof I affix my signature.

JOHN A. BRENNAN.